United States Patent Office 3,266,984
Patented August 16, 1966

3,266,984
CHRYSANTHEMIC ACID ESTERS
Kenzo Ueda, Nishinomiya-shi, Sadao Horie, Suita-shi, Toshio Mizutani, Ikeda-shi, Katsuji Nodera and Keimei Fujimoto, Minoo-shi, and Yositosi Okuno, Nishinomiya-shi, Japan, assignors to Sumitomo Chemical Company, Ltd., Higashi-ku, Osaka, Japan, a corporation of Japan
No Drawing. Filed Aug. 4, 1965, Ser. No. 477,290
Claims priority, application Japan, Aug. 28, 1964, 39/49,158; Aug. 29, 1964, 39/49,119; Sept. 15, 1964, 39/52,950, 39/52,951
10 Claims. (Cl. 167—33)

This invention relates to novel chrysanthemic acid esters, to a process for preparing the same, and to insecticidal compositions containing the same. More particularly, it relates to novel chrysanthemic acid esters having the general formula:

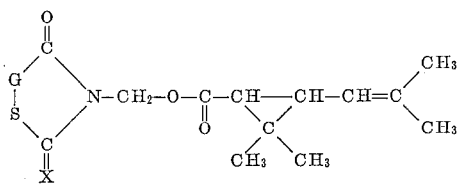

wherein G represents a member selected from the group consisting of

and

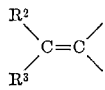

wherein $R^1$ is a member selected from the group consisting of hydrogen atom and lower alkyl radicals having 1 to 4 carbon atoms, and $R^2$ and $R^3$ each represent a member selected from the group consisting of hydrogen atom and lower alkyl radicals having 1 to 2 carbon atoms; and X represents a member selected from the group consisting of oxygen and sulfur atoms; to a process for preparing the same; and to insecticidal compositions containing the same.

It is one object of the invention to provide a novel group of chrysanthemic acid esters, which have strong insecticidal activities to house and agricultural insects with low toxicities to mammals and plants, and which can be commercially produced in low cost. Another object is to provide a process for preparing such novel esters by a commercially available procedure. Still another object is to provide insecticidal compositions containing such an ester. Other objects would be obvious from the following description.

As an insecticide utilizable with safety because of the harmlessness to mammals, pyrethrum extract has long been employed. Recently, allethrin which is an analogue of the effective ingredients in pyrethrum extract, i.e. pyrethrin and cinerin, was synthesized and developed for insecticidal uses. These ingredients are certainly valuable in their high insecticidal powers, especially in their rapid effect to insects, and in the characteristics of permitting no, or little, resistivity to insects. However, their uses are limited to some extent because of their complicated steps of the production and their great expense for the production.

The present inventors have made broad researches on the various chrysanthemic acid esters, and have now found the present novel group of chrysanthemic acid esters, which possess significant insecticidal power but are harmless to mammals, and which can be prepared from easily available materials by a simple process with low prices. In other words, the present compounds are thiazolidinomethyl esters of chrysanthemic acid. Accordingly, it is significant that the characteristics of the present compounds resemble pyrethrin, cinerin and allethrin, even though the alcohol moieties of the former are extremely simple as compared to those of the latter and are composed of carbon, hydrogen, oxygen, (sulfur) and nitrogen atoms, unlike the latter composed of carbon, hydrogen and oxygen.

Thus, the present invention is to provide novel chrysanthemic acid esters having the formula,

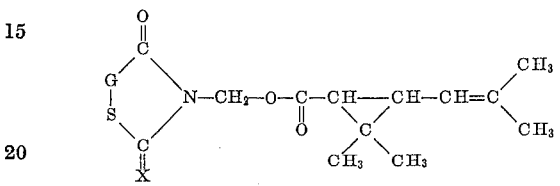

wherein G and X have the same meanings as identified above, and to provide a process for preparing such compounds, comprising esterifying a thiazolidine compound having the general formula,

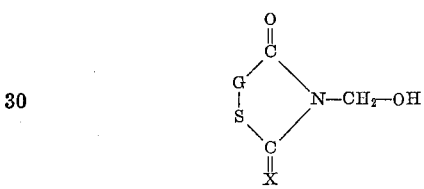

wherein G and X have the same meanings as identified above, with chrysanthemic acid having the formula,

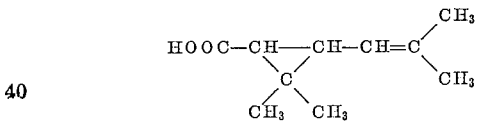

according to the general esterifying procedure.

The thiazolidine compounds employed in the present invention, in other words, N-methylol-thiazolidines or 3-(hydroxymethyl)-thiazolidines, may be prepared from the corresponding thiazolidine according to the procedures well known to those skilled in the art. For instance, 3-(hydroxymethyl)-thiazolidine may be prepared by reaction of thiazolidine with formaldehyde or its low molecular weight polymer according to the conventional methylolation conditions in the presence or absence of an alkaline catalyst, such as sodium hydroxide and potassium carbonate, in a solvent, such as water, benzene, and toluene. Similarly, various 3-(hydroxymethyl)-thiazolidines, as disclosed in the examples may be prepared.

The chrysanthemic acid employed in the present invention is the acidic moieties of pyrethrin I, cinerin I and allethrin, and can be synthesized according to the known method.

The esterification reaction of the present invention may be effected in various ways. The thiazolidine compound may be heated with the chrysanthemic acid in the presence of a strong acid, such as aromatic sulfonic acid and sulfuric acid, in an organic solvent capable of azeotropically boiling with water, thereby removing from the reaction system the water formed in the esterification. It may also be heated with a lower alkyl ester of the chrysanthemic acid in the presence of a basic catalyst, such as sodium, potassium, sodium alcoholate and potassium alcoholate, thereby to continuously remove the lower alcohol formed through the trans-esterification reaction out of the reaction system. In such a case, methyl, ethyl, n-propyl and isopropyl ester are suitable. In the most preferable esterification procedure, it may be treated with the chrysanthemic acid halide in an inert organic solvent, preferably in the presence of a dehydrohalogenating agent, such as pyridine, triethylamine and other tertiary amine whereby the esterification proceeds with the isolation of a hydrohalic acid salt within a short period of time. In this case, the acid chloride is the most preferable, though the bromide and the iodide may be employed. Further, it may be refluxed with the chrysanthemic acid anhydride in an inert solvent for several hours, thereby to yield the ester required and free crysanthemic acid, the latter being recovered and again converted to the anhydride by treatment with, for example, acetic anhydride for reuse. Alternatively, the thiazolidine compound may be employed for the esterification after being once converted to the form of the halide having the general formula,

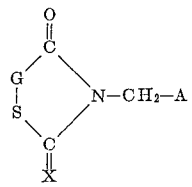

wherein G and X have the same meanings as identified above, and A means a halogen atom. In this case, the halide may be heated with an alkali metal or ammonium salt of the crysanthemic acid in an inert solvent, thereby to yield the ester required with the isolation of an alkali metal or ammonium halide salt. Alternatively, the halide may be heated with the free acid in an inert solvent in the presence of a dehydrohalogenating agent, such as tertiary amines. In the formula, A may be any of chlorine, bromine, and iodine, among which the former two are preferable and more practicable. As the alkali metals, sodium and potassium are preferable.

As is well-known, the chrysanthemic acid comprises various stereoisomers and optical isomers. It is needless to say that the acid and the derivatives thereof as described herein involve their isomers.

The process of the invention is described in more detail with reference to the following examples, which are however to be construed for the purpose of illustration and not of limitation.

EXAMPLES

*Method A which employs acid chloride*

Zero point zero two mol of a 3-hydroxymethyl-thiazolidine was mixed with 0.03 mol of dry pyridine and 20 ml. of dry toluene. On the other hand, another solution was prepared by mixing 0.021 mol of chrysanthemoyl chloride and 10 ml. of dry toluene. When both the solutions were mixed at a temperature below 40° C., reaction started exothermically and white crystal of pyridine hydrochloride was separated. The reaction was completed by allowing the reaction mixture held in a tightly stoppered vessel to stand overnight at room temperature. The mixture was then washed successively with 5% hydrochloric acid, 5% aqueous sodium carbonate solution and saturated sodium chloride solution and dried over anhydrous magnesium sulfate. Then the reaction mixture was purified by running down through a column packed with active alumina. After distilling off toluene at a reduced pressure and further driving off remaining toluene at a highly reduced pressure (0.01 mm. Hg) colorless or pale yellowish viscous oily product was obtained.

*Method B which employs acid anhydride*

Zero point zero two mol of a 3-hydroxymethyl-thiazolidine was mixed with 0.02 mol of chrysanthemic acid anhydride and 30 ml. of dry toluene and refluxed for 3 hours. After cooled the mixture was treated with 5% aqueous solution of sodium carbonate to remove by-produced chrysanthemic acid, washed with saturated aqueous solution of sodium chloride and dried over anhydrous magnesium sulfate. Thereafter the similar treatment as in the method A was carried out to obtain the product of ester.

*Method C which employs acid*

Zero point zero two mol of a 3-chloromethyl-thiazolidine obtained by reacting 3-hydroxymethyl-thiazolidine with thionyl chloride or phosphor trichloride at room temperature and 0.02 mol of chrysanthemic acid were dissolved in 40 ml. of dry acetone. Zero point zero two two mol of triethylamine was dropped to the mixture with stirring and the mixture was refluxed for 2 hours. Meanwhile triethylamine hydrochloride separated. After completion of the reaction the mixture was cooled and solid matter was filtered off. The filtrate was concentrated at a reduced pressure. The residue was dissolved in 30 ml. of toluene, washed successively with 5% hydrochloric acid, 5% aqueous solution of sodium carbonate and saturated aqueous solution of sodium chloride and dried over anhydrous magnesium sulfate. Thereafter the similar treatment as in the method A was carried out to obtain the product of ester.

The results of experiments carried out in accordance with the above-mentioned general procedure are shown in the following Tables I and II.

TABLE I

| Example No. | 3-hydroxymethyl thiazolidines used | Esterification method | R | Resultant ester $R-CH_2-O-\overset{\overset{O}{\|}}{C}-\overset{}{CH}-\overset{\overset{CH_3}{\diagdown}\overset{CH_3}{\diagup}}{\underset{}{C}}-CH-CH=C\overset{CH_3}{\diagdown}_{CH_3}$ | | | | | | |
|---|---|---|---|---|---|---|---|---|---|---|
| | | | | Molecular formula | Refractive index | Yield | Elementary analysis | | | |
| | | | | | | | | C(%) | H(%) | N(%) | S(%) |
| 1 | 3-hydroxymethyl-rhodanine. | A | CH₂—CO<br>\|       \\<br>\|        N—<br>S——CS | $C_{14}H_{19}NO_3S_2$ | $n_D^{28}1.5710$ | 75% | fd<br>cald | 53.98<br>53.67 | 6.45<br>6.07 | 4.09<br>4.47 | 19.97<br>20.45 |
| 2 | 3-hydroxymethyl-5-methylrhodanine. | A | CH₃—CH—CO<br>\|            \\<br>\|             N—<br>S——CS | $C_{15}H_{21}NO_3S_2$ | $n_D^{30}1.5447$ | 70% | fd<br>cald | 55.60<br>55.05 | 6.73<br>6.42 | 3.91<br>4.28 | 19.29<br>19.57 |

See footnote at end of table.

TABLE I—Continued

Resultant ester $R-CH_2-O-\overset{O}{\underset{\|}{C}}-CH-\underset{\underset{CH_3}{|}}{\overset{\overset{CH_3}{|}}{C}}-CH-CH=C\underset{CH_3}{\overset{CH_3}{<}}$

| Example No. | 3-hydroxymethyl thiazolidines used | Esterification method | R | Molecular formula | Refractive index | Yield | | Elementary analysis | | | |
|---|---|---|---|---|---|---|---|---|---|---|---|
| | | | | | | | | C(%) | H(%) | N(%) | S(%) |
| 3 | 3-hydroxymethyl-5-ethylrhodanine. | B | $C_2H_5CH-CO$ <br> \|  \ <br>         N— <br>      / <br> S—CS | $C_{16}H_{23}NO_3S_2$ | $n_D^{31}$1.5405 | 80% | fd <br> cald | 56.81 <br> 56.30 | 7.00 <br> 6.74 | 3.87 <br> 4.10 | 19.08 <br> 18.77 |
| 4 | 3-hydroxymethyl-5-propylrhodanine. | A | $n.C_3H_7-CH-CO$ <br> similar ring | $C_{17}H_{25}NO_3S_2$ | $n_D^{31}$1.5380 | 82% | fd <br> cald | 57.69 <br> 57.46 | 7.34 <br> 7.04 | 3.62 <br> 3.94 | 17.68 <br> 18.03 |
| 5 | 3-hydroxymethyl-5-isopropylrhodanine. | A | $i.C_3H_7-CH-CO$ <br> similar ring | $C_{17}H_{25}NO_3S_2$ | $n_D^{31}$1.5373 | 83% | fd <br> cald | 57.61 <br> 57.46 | 7.37 <br> 7.04 | 3.70 <br> 3.94 | 17.58 <br> 18.03 |
| 6 | 3-hydroxymethyl-5-butylrhodanine. | A | $n.C_4H_9-CH-CO$ <br> similar ring | $C_{18}H_{27}NO_3S_2$ | $n_D^{32}$1.5321 | 82% | fd <br> cald | 58.97 <br> 58.54 | 7.56 <br> 7.32 | 3.41 <br> 3.79 | 17.18 <br> 17.34 |
| 7 | 3-hydroxymethyl-2,4-dioxothiazolidine (used after chlorination). | C | $CH_2-CO$ <br> \|      N— <br> S—CO | $C_{14}H_{19}NO_4S$ | $n_D^{30}$1.5230 | 77% | fd <br> cald | 57.03 <br> 56.57 | 6.71 <br> 6.40 | 4.40 <br> 4.71 | 10.35 <br> 10.77 |
| 8 | 3-hydroxymethyl-5-methyl-2,4-dioxothiazolidine. | A | $CH_3-CH-CO$ <br> similar ring with CO | $C_{15}H_{21}NO_4S$ | $n_D^{31}$1.5130 | 79% | fd <br> cald | 58.22 <br> 57.88 | 7.16 <br> 6.75 | 4.29 <br> 4.50 | 10.02 <br> 10.29 |
| 9 | 3-hydroxymethyl-5-ethyl-2,4-dioxothiazolidine. | A | $C_2H_5-CH-CO$ <br> similar ring with CO | $C_{16}H_{23}NO_4S$ | $n_D^{31}$1.5211 | 85% | fd <br> cald | 60.32 <br> 59.08 | 7.60 <br> 7.08 | 3.97 <br> 4.31 | 9.51 <br> 9.87 |
| 10 | 3-hydroxymethyl-5-isopropyl-2,4-dioxothiazolidine. | A | $i.C_3H_7-CH-CO$ <br> similar ring with CO | $C_{17}H_{25}NO_4S$ | $n_D^{30}$1.5101 | 83% | fd <br> cald | 60.50 <br> 60.18 | 7.61 <br> 7.39 | 4.01 <br> 4.13 | 9.03 <br> 9.44 |
| 11 | 3-hydroxymethyl-5-butyl-2,4-dioxothiazolidine. | A | $n.C_4H_9-CH-CO$ <br> similar ring with CO | $C_{18}H_{27}NO_4S$ | $n_D^{31}$1.5046 | 85% | 6fd <br> cald | 62.03 <br> 61.76 | 7.91 <br> 7.65 | 3.68 <br> 3.97 | 8.69 <br> 9.07 |

(NOTE.—fd.=found, cald.=calculated.)

TABLE II

Resultant ester $R-CH_2-O-\overset{O}{\underset{\|}{C}}-CH-CH-CH=C\underset{CH_3}{\overset{CH_3}{<}}$ with $\underset{CH_3\ CH_3}{C}$ substituent

| Example No. | 3-hydroxymethyl thiazolidines used | Esterification method | R | Molecular formula | Refractive index | Yield | | Elementary analysis | | | |
|---|---|---|---|---|---|---|---|---|---|---|---|
| | | | | | | | | C(%) | H(%) | N(%) | S(%) |
| 12 | 3-hydroxymethyl-5-isopropylidene-2-thio-4-oxothiazolidine. | A | $(CH_3)_2C=C-CO$ <br> similar ring with CS | $C_{17}H_{23}NO_3S_2$ | $n_D^{23.5}$1.5905 | 78% | fd <br> cald | 58.20 <br> 57.79 | 6.84 <br> 6.52 | 3.66 <br> 3.97 | 17.01 <br> 18.13 |
| 13 | 3-hydroxymethyl-5-(1-methyl-propylidene)-2-thio-4-oxothiazolidine. | A | $CH_3$ <br>   $\searrow$ <br>   $C=C-CO$ <br> $C_2H_5\nearrow$ <br> with ring S—CS | $C_{18}H_{25}NO_3S_2$ | $n_D^{30}$1.5840 | 80% | fd <br> cald | 59.25 <br> 58.86 | 7.16 <br> 6.81 | 3.52 <br> 3.81 | 17.12 <br> 17.44 |
| 14 | 3-hydroxymethyl-5-(1-ethyl-propylidene)-2-thio-4-oxothiazolidine. | B | $(C_2H_5)_2C=C-CO$ <br> similar ring with CS | $C_{19}H_{27}NO_3S_2$ | $n_D^{32}$1.5793 | 70% | fd <br> cald | 60.19 <br> 59.84 | 7.37 <br> 7.09 | 3.30 <br> 3.67 | 16.41 <br> 16.80 |

See footnote at end of table.

TABLE II—Continued

Resultant ester $R-CH_2-O-\underset{\underset{}{\overset{O}{\|}}}{C}-CH\underset{\underset{CH_3\ CH_3}{C}}{---}CH-CH=C\underset{CH_3}{\overset{CH_3}{<}}$

| Example No. | 3-hydroxymethyl thiazolidines used | Esterification method | R | Molecular formula | Refractive index | Yield | Elementary analysis | | | |
|---|---|---|---|---|---|---|---|---|---|---|
| | | | | | | | | C(%) | H(%) | N(%) | S(%) |
| 15 | 3-hydroxymethyl-5-ethylidene-2-thio-4-oxothiazolidine. | A | $CH_3CH=C-CO\diagdown\atop{\diagup N-}\atop{S-CS}$ | $C_{16}H_{21}NO_3S_2$ | $n_D^{33}1.5840$ | 75% | fd<br>cald | 56.97<br>56.64 | 6.50<br>6.19 | 3.99<br>4.13 | 18.49<br>18.88 |
| 16 | 3-hydroxymethyl-5-propylidene-2-thio-4-oxothiazolidine. | B | $C_2H_5CH=C-CO\diagdown\atop{\diagup N-}\atop{S-CS}$ | $C_{17}H_{23}NO_3S_2$ | $n_D^{33}1.5792$ | 70% | fd<br>cald | 58.02<br>57.79 | 6.72<br>6.52 | 3.73<br>3.97 | 17.67<br>18.13 |
| 17 | 3-hydroxymethyl-5-isopropylidene-2,4-dioxothiazolidine. | A | $(CH_3)_2C=C-CO\diagdown\atop{\diagup N-}\atop{S-CO}$ | $C_{17}H_{23}NO_4S$ | $n_D^{31}1.5339$ | 86% | fd<br>cald | 60.62<br>60.53 | 7.02<br>6.82 | 3.97<br>4.15 | 9.22<br>9.50 |
| 18 | 3-hydroxymethyl-5-(1-methyl-propylidene)-2,4-dioxothiazolidine. | A | $CH_3\diagdown\atop C_2H_5\diagup C=C-CO\diagdown\atop{\diagup N-}\atop{S-CO}$ | $C_{19}H_{25}NO_4S$ | $n_D^{31}1.5304$ | 82% | fd<br>cald | 61.89<br>61.54 | 7.51<br>7.12 | 3.73<br>3.99 | 8.80<br>9.12 |
| 19 | 3-hydroxymethyl-5-(1-methyl-propylidene)-2,4-dioxothiazolidine (used after chlorinated). | C | $(C_2H_5)_2C=C-CO\diagdown\atop{\diagup N-}\atop{S-CO}$ | $C_{19}H_{27}NO_4S$ | $n_D^{32}1.5263$ | 71% | fd<br>cald | 62.90<br>62.47 | 7.69<br>7.40 | 3.51<br>3.84 | 8.41<br>8.77 |
| 20 | 3-hydroxymethyl-5-ethylidene-2,4-dioxothiazolidine. | A | $CH_3CH=C-CO\diagdown\atop{\diagup N-}\atop{S-CO}$ | $C_{16}H_{21}NO_4S$ | $n_D^{31}1.5294$ | 77% | fd<br>cald | 59.93<br>59.44 | 6.92<br>6.50 | 3.98<br>4.33 | 9.72<br>9.91 |
| 21 | 3-hydroxymethyl-5-normal propylidene 2,4-dioxothiazolidine. | A | $C_2H_5CH=C-CO\diagdown\atop{\diagup N-}\atop{S-CO}$ | $C_{17}H_{23}NO_4S$ | $n_D^{31}1.5247$ | 75% | fd<br>cald | 60.92<br>60.53 | 7.12<br>6.82 | 3.81<br>4.15 | 9.18<br>9.50 |

Note: fd.=found, cald.=calculated.

As mentioned above, the present esters possess superior insecticidal power, and exhibit rapid knock down and excellent killing effect on e.g. houseflies, mosquitos, cockroaches. Moreover, these esters are especially useful for sanitary and domestic purposes, because of their rapid effectiveness and harmlessness. The present esters are suitably employed for the preparation of insecticidal compositions which have broad uses, correlatively with the low cost.

For the formulation of the insecticidal composition containing the present compound as the essential ingredient, oil solution, emulsifiable concentrate, wettable powder, dust, aerosol, mosquito coil (a burning incense device for warding off mosquitoes), bait and other preparation, may be formulated using generally employed carriers, diluents or auxiliary agents, according to the method known to those skilled in the art in the cases of the formulation of pyrethrum extract and allethrin.

If desired, the present esters may be employed for the preparation of the insecticidal compositions in combination with another insecticidal component, such as pyrethroide, for example, pyrethrum extract and allethrin, organochlorine and organophosphorus compounds, synergistic agent for pyrethroide, for example, piperonyl butoxide, piperonyl sulfoxide, β-butoxy-β'-thiocyanodiethyl ether and the like. By combination with such other ingredient, the present insecticidal composition can be adapted to broader uses with increased effect.

The present esters may be blended with at least one of pyrethrin, allethrin, O,O-dimethyl-O-(3-methyl-4-nitrophenyl) thiophosphate, "Malathion," trademark, diazinone, dimethoate, γ-BHC, and others, to yield a pesticidal composition which possesses high insecticidal activity with rapid effectivity. In such cases, the two components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the formula

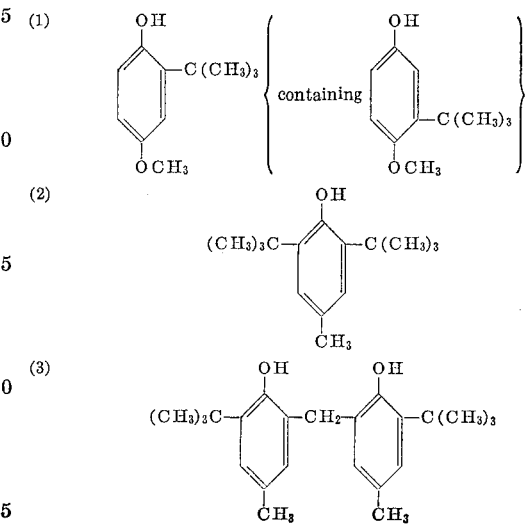

(4)

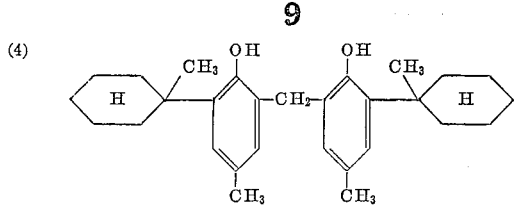

The amount of the stabilizer, if added, may be less than 1% by weight of the present ester, ordinarily from 1 to 0.1%.

The following are examples are insecticidal compositions containing the cyclopropanecarboxylic acid esters according to the invention and of the insecticidal activities. Parts are by weight.

EXAMPLES

A compound of the present invention shown below is made into an oil preparation using refined kerosene (in cases of some compounds, a small amount of xylene is added thereto). With use of a turn-table apparatus of Campbell (Campbell, F. L., Sullivan, W. N., Soap and Paint Chemicals, vol. 14, No. 6, p. 119, 1938) 5 ml. of the oil preparation is sprayed within 10 seconds. After 20 seconds, the shutter is opened and house fly adults (one group of about 100) are exposed to the sprayed mist for 10 minutes. Then the houseflies are transferred to an observation cage and the knock down numbers at that time and mortalities after 24 hours are calculated.

TABLE III

| Example No. | Concentration of effective ingredient (percent) | Knock down ratio after 10 minutes (percent) | Mortality after 24 hours (percent) |
|---|---|---|---|
| 22 | 1.0 | 100 | 92.5 |
| 23 | 1.0 | 100 | 98.3 |
| 24 | 1.0 | 100 | 96.4 |
| 25 | 1.0 | About 90 | 65.3 |
| 26 | 1.0 | 100 | 81.5 |
| 27 | 1.0 | About 90 | 61.6 |
| 28 | 0.5 | 100 | 89.5 |
| 29 | 0.5 | 100 | 92.0 |
| 30 | 0.5 | 100 | 86.5 |
| 31 | 1.0 | 100 | 68.1 |
| 32 | 1.0 | About 80 | 52.2 |
| 33 | 1.0 | 100 | 96.1 |
| 34 | 1.0 | 100 | 80.6 |
| 35 | 1.0 | About 80 | 55.7 |
| 36 | 1.0 | 100 | 68.4 |
| 37 | 1.0 | 100 | 75.4 |
| 38 | 0.25 | 100 | 90.3 |
| 39 | 0.5 | 100 | 97.6 |
| 40 | 0.5 | 100 | 81.3 |
| 41 | 1.0 | 100 | 80.5 |
| 42 | 1.0 | 100 | 84.5 |

In the above table the effective ingredient is as follows:

(22) 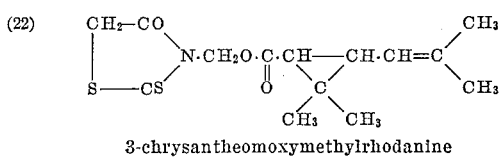

3-chrysantheomoxymethylrhodanine

(23) 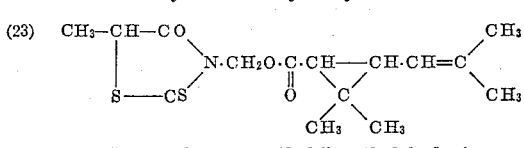

3-chrysanthemoxymethyl-5-methylrhodanine

(24) 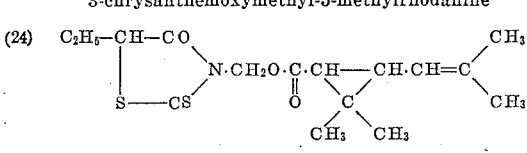

3-chrysanthemoxymethyl-5-ethylrhodanine

(25) 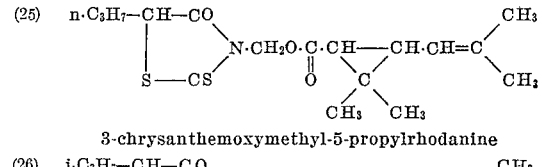

3-chrysanthemoxymethyl-5-propylrhodanine

(26) 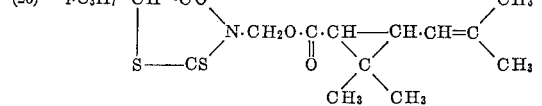

3-chrysanthemoxymethyl-5-isopropylrhodanine

(27) 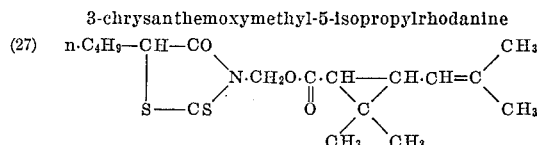

3-chrysanthemoxymethyl-5-butylrhodanine

(28) 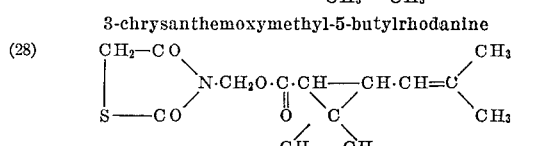

3-chrysanthemoxymethyl-2,4-dioxothiazolidine

(29) 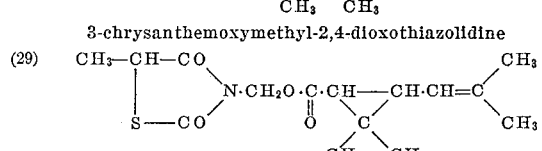

3-chrysanthemoxymethyl-5-methyl-2,4-dioxothiazolidine

(30) 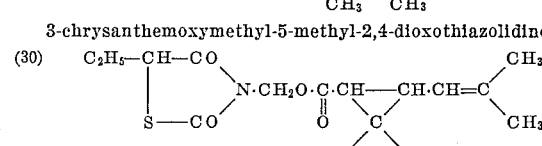

3-chrysanthemoxymethyl-5-ethyl-2,4-dioxothiazolidine

(31) 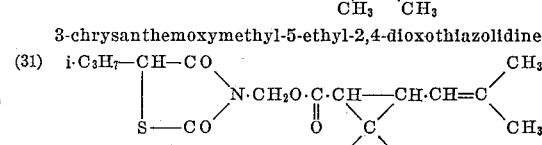

3-chrysanthemoxymethyl-5-isopropyl-2,4-dioxothiazolidine

(32) 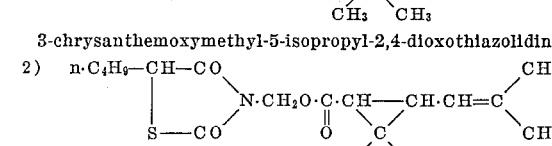

3-chrysanthemoxymethyl-5-butyl-2,4-dioxothiazolidine

(33) 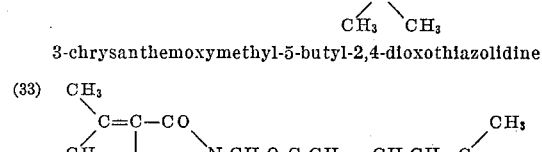

3-chrysanthemoxymethyl-5-isopropylidene-2-thio-4-oxothiazolidine

(34) 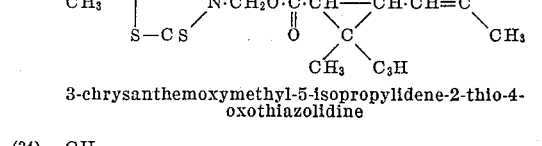

3-chrysanthemoxymethyl-5-(1-methyl-normal propylidene)-2-thio-4-oxothiazolidine

(35) 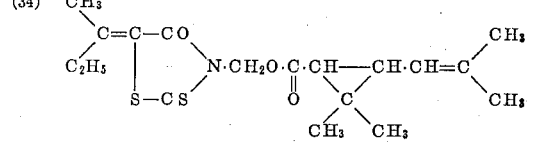

3-chrysanthemoxymethyl-5-(1-ethyl propylidene)-2-thio-4-oxothiazolidine

(36)
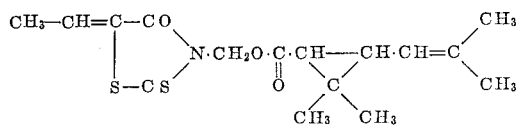
3-chrysanthemoxymethyl-5-ethylidene-2-thio-4-oxothiazolidine

(37)
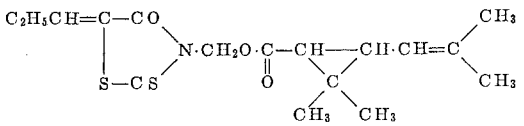
3-chrysanthemoxymethyl-5-propylidene-2-thio-4-oxothiazolidine

(38)
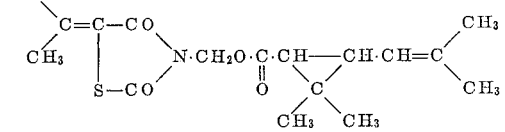
3-chrysanthemoxymethyl-5-isopropylidene-2,4-dioxothiazolidine

(39)
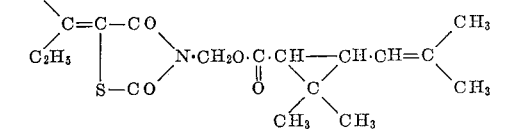
3-chrysanthemoxymethyl-5-(1-methyl normal propylidene)-2,4-dioxothiazolidine

(40)
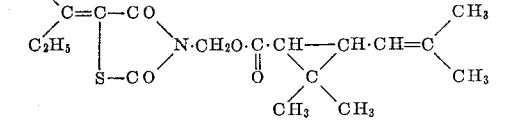
3-chrysanthemoxymethyl-5-(1-ethyl normal propylidene)-2,4-dioxothiazolidine

(41)
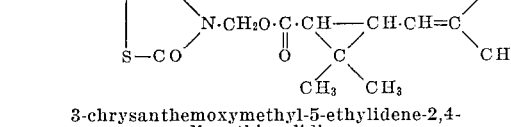
3-chrysanthemoxymethyl-5-ethylidene-2,4-dioxothiazolidine

(42)
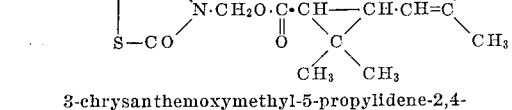
3-chrysanthemoxymethyl-5-propylidene-2,4-dioxothiazolidine

*Example 43*

Ten parts of 3-chrysanthemoxymethylrhodanine, 10 parts of Sorpol SM-200 (a trade name of a surfactant manufactured by Toho Chemical Co., Ltd.), and 80 parts of xylene were mixed in this order and dissolved with stirring to produce an emulsifiable concentrate.

Housefly adults (one group of about 50) were liberated in a high Petri dish, which was then closed with a metal net lid and charged to the bottom of a settling tower. Ten ml. of the solution of the above-mentioned oil preparation diluted 10 times with water was sprayed upward by a pressure of 20 lb. per sq. in. After 20 seconds, the shutter was opened and the houseflies were exposed to the descending mist for 10 minutes, taken out and placed in a room kept at a temperature of 27° C. The mortality was 80.5 percent after 20 hours.

*Example 44*

Two parts of 3-chrysanthemoxymethyl-5-methylrhodanine was dissolved in 20 parts of acetone and 98 parts of 200 mesh talc were added thereto. After sufficiently stirred and mixed in a mortar, the mixture was freed from acetone by evaporation to produce dust.

Housefly adults (one group of about 50) were liberated in a high Petri dish, which was then closed with a metal net lid and charged to the bottom of a settling tower. One gram of the above-mentioned dust was scattered upward by a pressure of 20 lb. per sq. in. After 10 seconds, the shutter was opened and the houseflies were exposed to the descending powder for 10 minutes, taken out and in a room kept at a temperature of 27° C. The mortality was 97.6 percent after 20 hours.

*Example 45*

One point five g. of 3-chrysanthemoxymethyl-5-methyl-2,4-dioxothiazolidine was dissolved in 30 ml. of acetone and the solution was stirred and mixed with 98.5 g. of a mosquito coil carrier (a blend of tabu powder and pyrethrum marc in 2:3 proportion by weight). After evaporating acetone, 100 ml. of water was added to the mixture and the mixture was kneaded. Sufficiently kneaded mixture was molded and dried whereby mosquito coil containing 1.5 percent of effective ingredient was obtained.

About 30 northern house mosquitoes (adult) were liberated in a 70 cm.³ glass box, one g. of the above-mentioned mosquito coil was held horizontally on a mosquito coil holder placed in the center of bottom of the box, both ends of the mosquito coil were ignited and the knock down number of the mosquitoes was counted. The result is as follows:

KNOCK DOWN RATIO OF NORTHERN HOUSE MOSQUITOES RELATIVE TO ELAPSE OF TIME (PERCENT)

|  | 3 min. | 6 min. | 12 min. | 24 min. | 48 min. |
|---|---|---|---|---|---|
| The mosquito coil containing 1.5 percent of the composition of the present invention | 4.9 | 15.1 | 49.4 | 93.4 | 96.9 |

*Example 46*

Zero point five parts of 3-chrysanthemoxymethyl-5-ethyl-2,4-dioxothiazolidine was dissolved in two parts of xylene and refined kerosene was added thereto to make the volume 100 ml. in total whereby 0.5 percent by weight of oil preparation was obtained.

About 30 houseflies (adult) were liberated in a 70 cm.³ glass box, 0.3 ml. of the above-mentioned oil preparation was sprayed uniformly in the space of the box with an atomizer and the knock down number of the houseflies relative to elapse of time was observed. The result is shown as follows:

KNOCK DOWN RATIO OF HOUSEFLIES RELATIVE TO ELAPSE OF TIME (PERCENT)

|  | 30 sec. | 1 min. | 2 min. | 4 min. | 8 min. | 11 min. 20 sec. |
|---|---|---|---|---|---|---|
| The composition of the present invention | 0 | 3.9 | 25.4 | 43.9 | 59.7 | 78.5 |
| An oil preparation containing 3% allethrin | 0 | 7.7 | 24.9 | 53.6 | 65.1 | 76.7 |

*Example 47*

In similar way as described in Example 43, a 10% emulsifiable concentrate containing 3-chrysanthemoxymethyl-5-isopropylidene-2-thio-4-oxothiazolidine was prepared and tested. Mortality after 20 hours was 88.0%.

*Example 48*

In similar way as described in Example 44, a 2% dust preparation containing 3-chrysanthemoxymethyl-5-ethylidene-2-thio-4-oxothiazolidine was prepared and tested. Mortality after 20 hours was 90.6%.

Example 49

In similar way as described in Example 46, a 0.3% oil preparation containing 3-chrysanthemoxymethyl-5-isopropylidene-2,4-dioxothiazolidine was prepared and tested. The result is shown as follows:

KNOCK DOWN RATIO OF HOUSEFLIES ACCORDING TO THE LAPSE OF TIME (PERCENT)

|  | 30 sec. | 1 min. | 2 min. | 4 min. | 8 min. | 11 min. 20 sec. |
|---|---|---|---|---|---|---|
| The composition of the present invention | 0 | 2.8 | 28.0 | 54.9 | 75.1 | 78.9 |
| Allethrin 0.3% oil preparation | 0 | 7.7 | 38.5 | 53.9 | 69.4 | 84.6 |

Example 50

In similar way as described in Example 45, a 1.5% mosquito coil containing 3-chrysanthemoxymethyl-5-isopropylidene-2,4-dioxothiazolidine was prepared and tested.

KNOCK DOWN RATIO OF NORTHERN HOUSE MOSQUITOES RELATIVE TO ELAPSE OF TIME (PERCENT)

|  | 3 min. | 6 min. | 12 min. | 24 min. |
|---|---|---|---|---|
| The mosquito coil of the present invention | 4.3 | 18.7 | 63.8 | 94.8 |

Example 51

0.4 part of 3-chrysanthemoxymethyl-5-(1-methyl-normal propylidene)-2,4-dioxothiazolidine, 2 parts of piperonyl butoxide, 6.3 parts of xylene and 6.3 parts of refined kerosene were mixed and charged to an aerosol vessel. After fixing a valve part, 85 parts of ejecting agent (e.g. Freon, monomeric vinyl chloride, liquefied petroleum gas or the like) were charged by a pressure to produce aerosol.

About 30 houseflies (adult) were liberated in a 70 cm.³ glass box, the above-mentioned aerosol was sprayed in the space of the box for one second (the amount of the active ingredient was about 0.6 g.) and the knock down number of the houseflies was counted. The result is as follows:

KNOCK DOWN RATIO OF HOUSEFLIES RELATIVE TO ELAPSE OF TIME (PERCENT)

|  | 30 sec. | 1 min. | 2 min. | 4 min. | 8 min. | 11 min. 20 sec. |
|---|---|---|---|---|---|---|
| The composition of the present invention | 1.5 | 12.6 | 37.3 | 64.2 | 86.0 | 97.6 |

What we claim is:

1. A chrysanthemic acid ester having the formula,

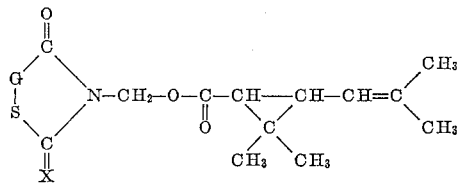

wherein G represents a member selected from the group consisting of

and

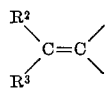

wherein $R^1$ is a member selected from the group consisting of hydrogen atom and lower alkyl having 1 to 4 carbon atoms, and $R^2$ and $R^3$ each represent a member selected from the group consisting of hydrogen atom and lower alkyl having 1 to 2 carbon atoms; and X represents a member selected from the group consisting of oxygen and sulfur atoms.

2. An insecticidal composition containing a chrysanthemic acid ester as defined in claim 1, as the essential active ingredient and an inert carrier.

3. An insecticidal oil solution containing a chrysanthemic acid ester as defined in claim 1, as the essential active ingredient and an inert solvent.

4. An insecticidal emulsifable concentrate containing a chrysanthemic acid ester as defined in claim 1, as the essential active ingredient, a dispersing agent, and an inert solvent.

5. An insecticidal dust preparation containing a chrysanthemic acid aster as defined in claim 1, as the essential active ingredient, and a powdered carrier.

6. An insecticidal wettable powder containing a chrysanthemic acid ester as defined in claim 1, as the essential active ingredient, a dispersing agent and a powdered carrier.

7. An insecticidal aerosol containing a chrysanthemic acid ester as defined in claim 1, as the essential active ingredient and propellant.

8. A mosquito coil containing a chrysanthemic acid ester as defined in claim 1, as the essential active ingredient and a mosquito coil carrier.

9. An insecticidal bait preparation containing a chrysanthemic acid ester as defined in claim 1, as the essential active ingredient, and food materials for insects.

10. A method for killing insects, which comprises treating the insects with a toxic amount of a chrysanthemic acid ester having the formula,

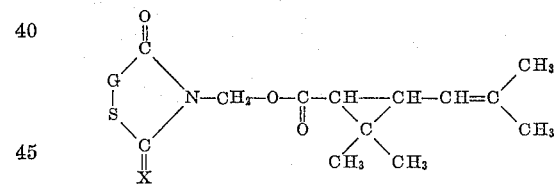

wherein G represents a member selected from the group consisting of

and

wherein $R^1$ is a member selected from the group consisting of hydrogen atom and lower alkyl having 1 to 4 carbon atoms, and $R^2$ and $R^3$ each represent a member selected from the group consisting of hydrogen atom and lower alkyl having 1 to 2 carbon atoms; and X represents a member selected from the group consisting of oxygen and sulfur atoms.

No references cited.

JULIAN S. LEVITT, *Primary Examiner.*

STANLEY J. FRIEDMAN, *Assistant Examiner.*